(12) United States Patent
Taylor et al.

(10) Patent No.: US 9,594,635 B2
(45) Date of Patent: Mar. 14, 2017

(54) SYSTEMS AND METHODS FOR SEQUENTIAL RESILVERING

(71) Applicant: Oracle International Corporation, Redwood City, CA (US)

(72) Inventors: Eric Carl Taylor, Superior, CO (US); Blaise Sanouillet, Rickmansworth (GB); Roch Bourbonnais, Corenc (FR)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 87 days.

(21) Appl. No.: 14/477,645

(22) Filed: Sep. 4, 2014

(65) Prior Publication Data

US 2015/0355968 A1 Dec. 10, 2015

Related U.S. Application Data

(60) Provisional application No. 62/009,825, filed on Jun. 9, 2014.

(51) Int. Cl.
*G06F 11/00* (2006.01)
*G06F 11/10* (2006.01)

(52) U.S. Cl.
CPC .............................. *G06F 11/1092* (2013.01)

(58) Field of Classification Search
CPC ............. G06F 11/1092; G06F 11/1088; G06F 11/2056; G06F 11/1435; G06F 2201/84
USPC ......................................................... 714/6.2
See application file for complete search history.

(56) References Cited

U.S. PATENT DOCUMENTS

| | | | | |
|---|---|---|---|---|
| 5,448,718 A * | 9/1995 | Cohn | ................... | G06F 11/1466 707/999.202 |
| 5,497,483 A * | 3/1996 | Beardsley | ........... | G06F 11/1466 711/100 |
| 5,517,632 A * | 5/1996 | Matsumoto | ........... | G06F 3/0601 711/114 |
| 5,675,767 A * | 10/1997 | Baird | ................... | G06F 11/1435 711/156 |
| 6,081,774 A * | 6/2000 | de Hita | ............. | G06F 17/30663 704/9 |
| 6,208,999 B1 * | 3/2001 | Spilo | .................... | G06F 11/1435 |
| 2005/0283754 A1 * | 12/2005 | Vignet | ................... | G06Q 10/10 717/104 |
| 2007/0106677 A1 * | 5/2007 | Moore | ................ | G06F 11/1435 |
| 2007/0168569 A1 * | 7/2007 | Bonwick | ............... | G06F 3/0611 710/5 |

(Continued)

*Primary Examiner* — Yair Leibovich
(74) *Attorney, Agent, or Firm* — Kilpatrick Townsend & Stockton LLP (57) ABSTRACT

Implementations claimed and described herein provide systems and methods for the efficient rebuilding of a failed storage device through sequential resilvering. In one implementation, blocks for resilvering are discovered. The blocks correspond to input/output requests not successfully completed for a failed storage device. A coarse grained sorting of the blocks is performed based on a block location of each of the blocks on the failed storage device. The block locations of the blocks are stored in memory according to the coarse grained sorting. A fine grained sorting of the blocks is performed based on the coarse grained sorting of the blocks. The blocks are sequentially resilvered based on the fine grained sorting.

20 Claims, 8 Drawing Sheets

(56) References Cited

U.S. PATENT DOCUMENTS

| | | | |
|---|---|---|---|
| 2014/0059552 A1* | 2/2014 | Cunningham | G09G 5/00 718/102 |
| 2014/0201565 A1* | 7/2014 | Candea | G06F 11/079 714/6.2 |
| 2014/0365819 A1* | 12/2014 | Cooper | G06F 11/1092 714/6.22 |
| 2016/0173881 A1* | 6/2016 | Alshina | H04N 19/186 375/240.08 |

* cited by examiner

SYSTEMS AND METHODS FOR SEQUENTIAL RESILVERING

CROSS-REFERENCE TO RELATED APPLICATIONS

The present application claims benefit under 35 U.S.C. §119 to U.S. Provisional Patent Application No. 62/009,825, entitled "Systems and Methods for Sequential Resilvering" and filed on Jun. 9, 2014, which is incorporated by reference herein in its entirety.

TECHNICAL FIELD

Aspects of the present disclosure relate to data storage systems, and in particular, to systems and methods for rebuilding a failed disk or other storage device in a data storage system.

BACKGROUND

The continuous expansion of the Internet, the expansion and sophistication of enterprise computing networks and systems, the proliferation of content stored and accessible over the Internet, and numerous other factors continue to drive the need for large sophisticated data storage systems. Consequently, as the demand for data storage continues to increase, larger and more sophisticated storage systems are being designed and deployed. Many large scale data storage systems utilize storage appliances that include arrays of storage media. These storage appliances are capable of storing incredible amounts of data. For example, at this time, Oracle's SUN ZFS Storage 7420 appliance can store over 2 petabytes of data (over 2 quadrillion bytes of data). Moreover, multiple storage appliances may be networked together to form a cluster, which allows for an increase in the volume of stored data.

Typically, these storage systems include a file system for storing and accessing files. In addition to storing system files (operating system files, device driver files, etc.), the file system provides storage and access of user data files. If any of these files (system files and/or user files) contain critical data, then it becomes advantageous to employ a data backup scheme to ensure that critical data is not lost if a file storage device fails. One data backup scheme that is commonly employed is mirroring. Mirroring involves maintaining two or more copies of a file, where each copy of the file is located on a separate file storage device (e.g., a local hard disk, a networked hard disk, a network file server, etc.). For example, storage appliances arranged in a cluster may be configured to mirror data so that if one of the storage appliances becomes inoperable, the data is available at another storage location.

When one or more file storage devices fails for any length of time, the file storage device(s) may become unsynchronized. However, when employing a mirroring scheme, the mirrors should be synchronized (i.e., the contents of each mirror are the same) to ensure critical data is backed up. If a mirror becomes unsynchronized, the simplest recovery scheme involves copying all of the data from a synchronized mirror to the unsynchronized mirror. However, copying all data from one file storage device to another file storage device may take a long time and reduce performance of the file storage devices significantly during the resynchronization process.

It is with these observations in mind, among others, that various aspects of the present disclosure were conceived and developed.

SUMMARY

Implementations described and claimed herein address the foregoing problems by providing systems and methods for efficient rebuilding of a failed data storage device. In one implementation, blocks for resilvering are discovered. The blocks correspond to input/output requests not successfully completed for a failed storage device. A coarse grained sorting of the blocks is performed based on a block location of each of the blocks on the failed storage device. The block locations of the blocks are stored on disk according to the coarse grained sorting. A fine grained sorting of the blocks is performed based on the coarse grained sorting of the blocks. The blocks are sequentially resilvered based on the fine grained sorting.

In another implementation, blocks are discovered for resilvering. An object array having a first temporary object is stored on disk, and a first subset of the blocks is sorted into the first temporary object based on a block location of each of the blocks. Each of the blocks in the first temporary object is read into a sorted tree and is sequentially resilvered based on the sorted tree. The first temporary object is deleted following the sequential resilvering of the blocks in the first subset.

In still another implementation, a storage pool having a plurality of storage devices configured to store data is in communication with a file system. The file system has at least one processor configured to identify a failed device in the plurality of storage devices. The failed device corresponds to blocks for which input/output requests were not successfully completed. The at least one processor of the file system is further configured to sequentially resilver the blocks based on a plurality of sorted trees. Each of the sorted trees corresponds to one of a plurality of temporary objects in an object array.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

DETAILED DESCRIPTION

Aspects of the presently disclosed technology relate to systems and methods for sequential resilvering. When a disk in a storage pool fails, the data from the failed disk needs to be rebuilt on a spare disk as quickly as possible. A resilver is performed by traversing the data in a logical block order. File systems utilizing a copy-on-write transactional object model, such as Oracle's SUN ZFS storage appliances, generally reconstruct the data according to when the block was written. Copy-on-write involves all block pointers within the filesystem containing a checksum or hash of a target block, which is verified when the block is read. Rather than overwriting blocks containing active data in place, a new block is allocated, modified data is written to the new block, and any metadata blocks referencing the block are similarly read, reallocated, and written. Stated differently, when a block is updated with new data, it is written to a new location.

Conventional resilvering generally involves traversing metadata, issuing a repair I/O, traversing the next metadata, and so on. As such, file systems using copy-on-write, for example, may experience small random Input/Outputs (I/O's) to the drive during conventional resilvering, increasing resilvering time. Accordingly, in one aspect of the present disclosure, each block is described by a block id (i.e. the number of the block within a file or object). The block id is then mapped to a Data Virtual Address (DVA), which maps to a specific location on disk. During resilvering, the block locations are recorded on disk, the block locations are read and sorted, and the blocks are resilvered sequentially, thereby resulting in larger, sequential I/O's and significantly reduced resilvering times (e.g., a quarter of conventional resilvering times). Stated differently, in one aspect of the presently disclosed technology, resilvering is performed in two phases: a populating phase and an iterating phase. During the populating phase, an array of on-disk objects (buckets) is created. The number of buckets in the array is based on the amount of memory. For each block pointer that is on the disk to be resilvered, a disk offset describing the block location is appended to one of the buckets. The object written is based on the DVA offset. The iterating phase involves reading the block pointers in one of the buckets into a sorted tree (e.g., an Adelson Velskii Landis (AVL) tree) by block location disk offset. The AVL tree corresponds to a partially-balanced binary tree. The block pointers are then resilvered sequentially based on the sorted tree. The bucket is deleted, and the block pointers in the next bucket in the array are sorted. The iterating phase is repeated until all the buckets are deleted.

For example, for a 200 GB disk, 200 array buckets may be created. Any block that falls within the first 1 GB of the disk will be sorted into the first bucket, any block that falls within the second 1 GB of the disk will be sorted into the second bucket, and so on until the 200 GB disk is sorted into buckets. The blocks in the first bucket are sorted into a sorted tree based on block location disk offset, and all of the blocks in the first bucket are sequentially resilvered. As such, all of the blocks residing in the first 1 GB of the disk is sequentially written. This is repeated for the second 1 GB of the disk until all of the blocks are resilevered for the 200 GB disk.

While the various example implementations discussed herein reference mirrored storage appliances, it will be appreciated that the presently disclosed technology may be implemented in another computing contexts for rebuilding or copying data. Those skilled in the art will also appreciate that resilvering I/O requests may also be used to resilver one or more disks in the storage pool, where the data (or metadata) is stored in the storage pool using a Redundant Array of Inexpensive Disks (RAID) scheme. If the data (or metadata) is stored using a RAID scheme, then resilvering the disk may correspond to first reconstructing the data (or metadata) in accordance with the RAID scheme and then issuing a resilvering I/O to write the reconstructed data (or metadata) to the appropriate disk in the storage pool.

Figure 1:
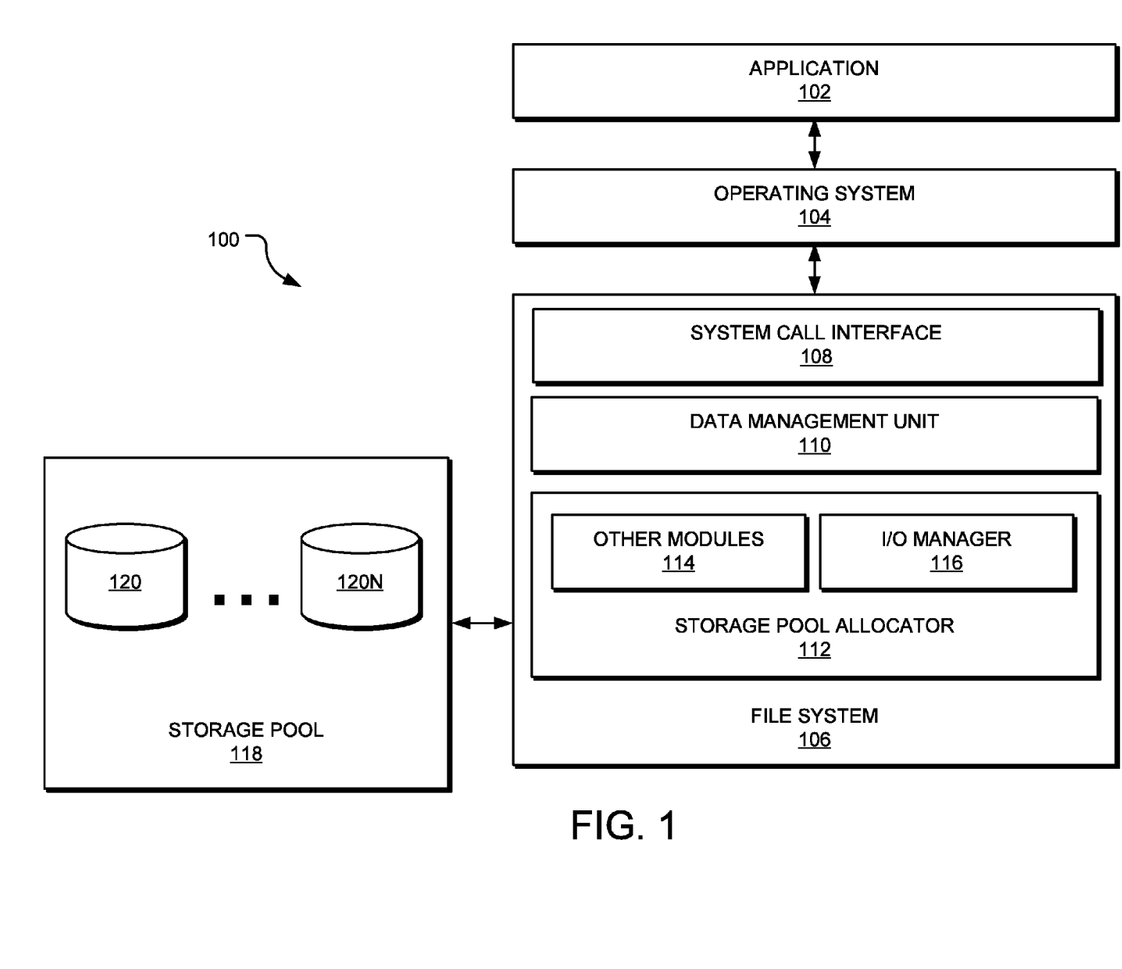
FIG. 1 is an example network file system implementing sequential resilvering systems and methods.

FIG. 1 is an example network file system 100 implementing sequential resilvering systems and methods. In one implementation, the system 100 includes an application 102 interfacing with an operating system 104. The operating system 104 includes functionality to interact with a file system 106, which in turn interfaces with a storage pool 118. The operating system 104 typically interfaces with the file system 106 via a system call interface 108. The operating system 104 provides operations for users to access files within the file system 106. These operations may include read, write, open, close, or the like. In one implementation, the file system 106 is an object-based file system (i.e., both data and metadata are stored as objects). More specifically, the file system 106 includes functionality to store both data and corresponding metadata in the storage pool 118.

In one implementation, operations provided by the operating system 104 correspond to operations on objects. Stated differently, a request to perform a particular operation (i.e., a transaction) is forwarded from the operating system 104, via the system call interface 108, to a data management unit (DMU) 110. In one implementation, the DMU 110 translates the request to perform an operation on an object directly to a request to perform a read or write operation (i.e., an I/O request) at a physical location within the storage pool 118. A storage pool allocator (SPA) 112 receives the request from the DMU 110 and writes the blocks into the storage pool 118. In one implementation, the storage pool 118 includes one or more physical disks 120 . . . 120N. The storage capacity of the storage pool 118 may increase and decrease dynamically as physical disks 120 are added and removed from the storage pool 118. In one implementation, the SPA 112 manages the storage space available in the storage pool 118.

In one implementation, the SPA 112 includes an I/O manager 116 and other modules 114, which may be used by the SPA 112 to read data from and/or write data to the storage pool 118. In one implementation, the I/O management module 114 receives I/O requests and groups the I/O requests into transaction groups. The other modules 114 may include, without limitation, a compression module, an encryption module, a checksum module, and a metaslab allocator. The compression module compresses larger logical blocks into smaller segments, where a segment is a region of physical disk space. In one implementation, the encryption module provides various data encryption algorithms. The data encryption algorithms may be used, for example, to prevent unauthorized access. In one implementation, the checksum module calculates a checksum for data and metadata within the storage pool 118. The checksum may be used, for example, to ensure data has not been corrupted. As discussed above, the file system 106 provides an interface to the storage pool 118 and manages allocation of storage space within the storage pool 118. In one implementation, the SPA 112 uses the metaslab allocator to manage the allocation of storage space in the storage pool 118.

Copy-on-write transactions may be performed for a data write request to a file. In one implementation, all write requests cause new segments to be allocated for the modified data. Thus, retrieved data blocks and corresponding metadata are never overwritten until a modified version of the data block and metadata is committed. Stated differently, the DMU 110 writes all the modified data blocks to unused segments within the storage pool 118 and subsequently writes corresponding block pointers to unused segments within the storage pool 118. To complete a copy-on-write transaction, the SPA 112 issues an I/O request to reference the modified data block. Where one of the disks 120 . . . 120N fails, an I/O request may not be successfully completed (i.e., the data was not stored on disk). The file system 106 may provide various systems and methods for identifying a failed disk and discovering blocks for resilvering. For example, a dirty time log may be maintained by the SPA 112 for the storage pool 118 with each entry identifying a failed disk and when the failed disk was offline or for individual disks 120 with entries tracking which I/O requests were not successfully completed to a disk 120.

As can be understood from FIG. 1, in one implementation, when one of the disks 120 . . . 120N in the storage pool 118 fails, the file system 106 activates a spare disk for the data on the failed disk 120 to be reconstructed on the spare disk 120N. The file system 106 discovers block locations corresponding to data stored on the failed disk 120. The block locations are recorded on disk. Coarse sorting is performed where the blocks are sorted based on the block locations into one or more buckets based on the amount of disk memory. Fine grained sorting is performed on a first of the buckets where the blocks in the first bucket are sorted into an Adelson Velskii Landis (AVL) tree. The blocks are then sequentially resilvered based on the block location. Once all the blocks in the first bucket are resilvered, the bucket is deleted, and the blocks in the next bucket are sorted at a fine grained level. This process is repeated until all the blocks in each of the buckets are resilvered.

Stated differently, the file system 106 creates an array of on-disk objects. The number of objects in the array is based on the amount of memory in the disk 120. For each block that is on the failed disk 120, a disk offset describing the block location is appended to one of the objects, and the object written is based on the DVA offset. The file system 106 reads the blocks in the object into a sorted tree (e.g., an AVL tree) by block location disk offset. The AVL tree corresponds to a partially-balanced binary tree. The file system 106 sequentially resilvers the blocks based on the sorted tree. The file system 106 deletes the object and sorts the blocks in the next object in the array. The file system 106 repeats this until all the objects in the array are deleted.

Figure 2:
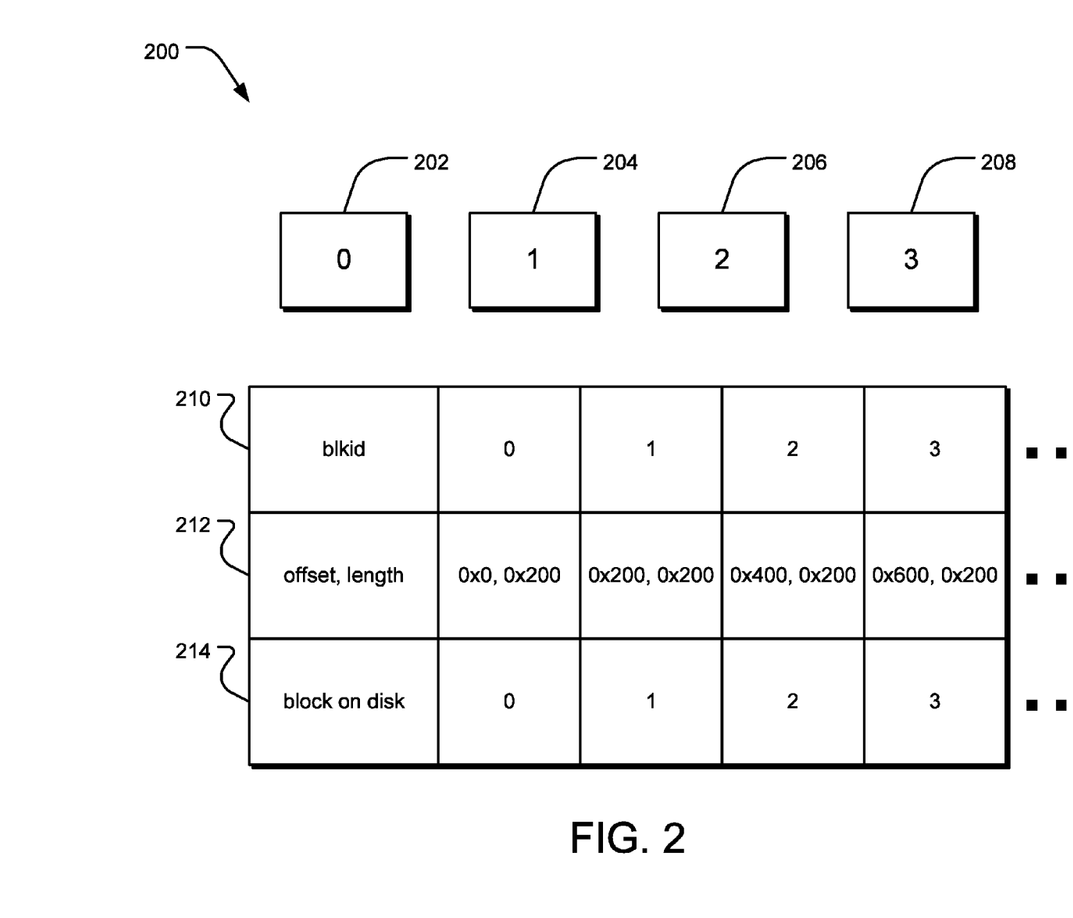
FIG. 2 is an example file with sequential data.

FIG. 2 is an example file 200 with sequential data. In one implementation, the file 200 includes blocks 202-208. As can be understood from FIG. 2, each of the blocks has a corresponding block id 210, DVA offset 212, and block on disk 214. For example, the block id 210 for the blocks 202-208 is 0, 1, 2, and 3, respectively, and the block on disk 214 for the blocks 202-208 is 0, 1, 2, 3, respectively. Accordingly, a resilver of the file 200 would be relatively efficient because the block on disk 214 is sequential for the blocks 202-208: 0, 1, 2, 3.

Figure 3:
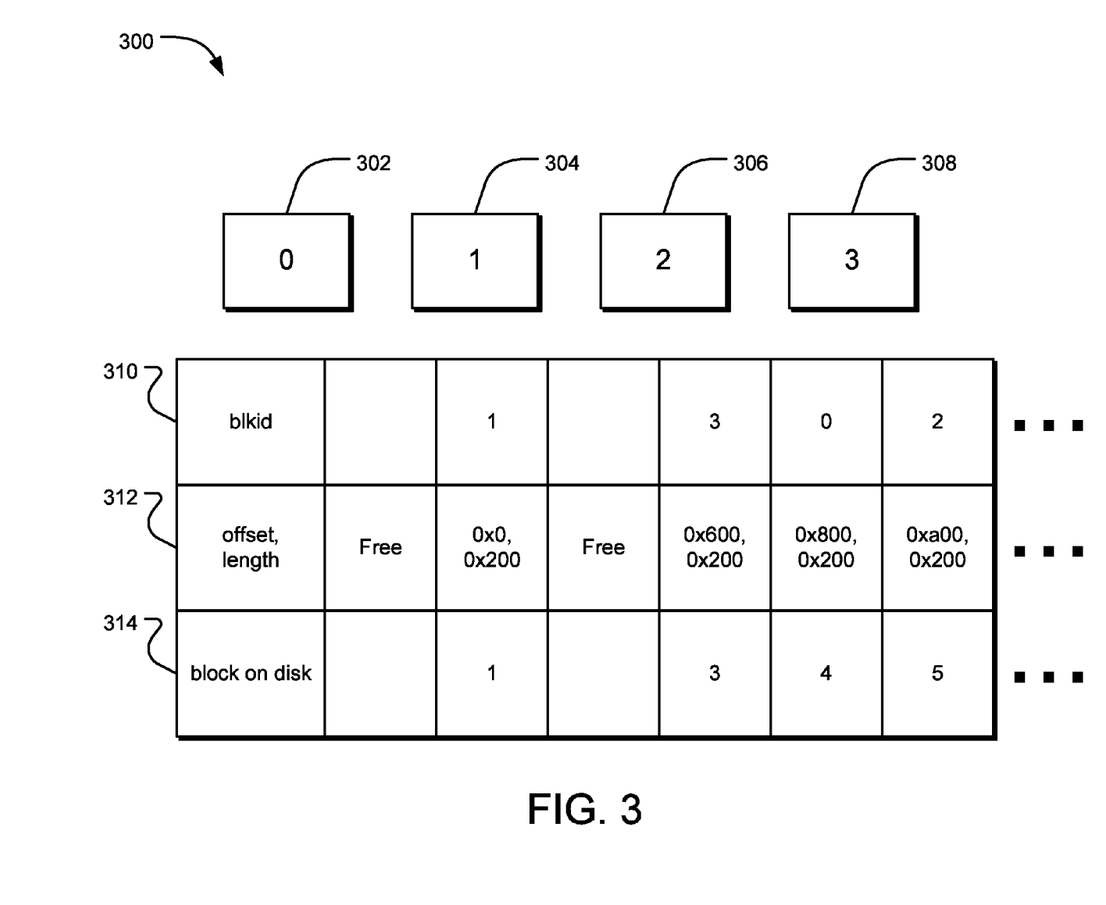
FIG. 3 illustrates an example file after subsequent operations.

In contrast, as can be understood from FIG. 3, which illustrates an example file 300 after subsequent operations rewriting one block, a resilver of the file 300 will result in small random I/O's to the drive. In one implementation, the file 300 includes blocks 302-308 with one block rewritten. As can be understood from FIG. 3, each of the blocks has a corresponding block id 310, DVA offset 312, and block on disk 314. For example, the block id 310 for the blocks 302-308 is 0, 1, 2, and 3, respectively, and the block on disk 314 for the blocks 302-308 is 1, 3, 4, 5, respectively. Accordingly, a resilver of the file 300 would be relatively inefficient and result in small I/O's to the drive because the block on disk 314 is not sequential for the blocks 302-308, with the order in which the blocks would be read and rewritten being: 4, 1, 5, 3.

Figure 4:
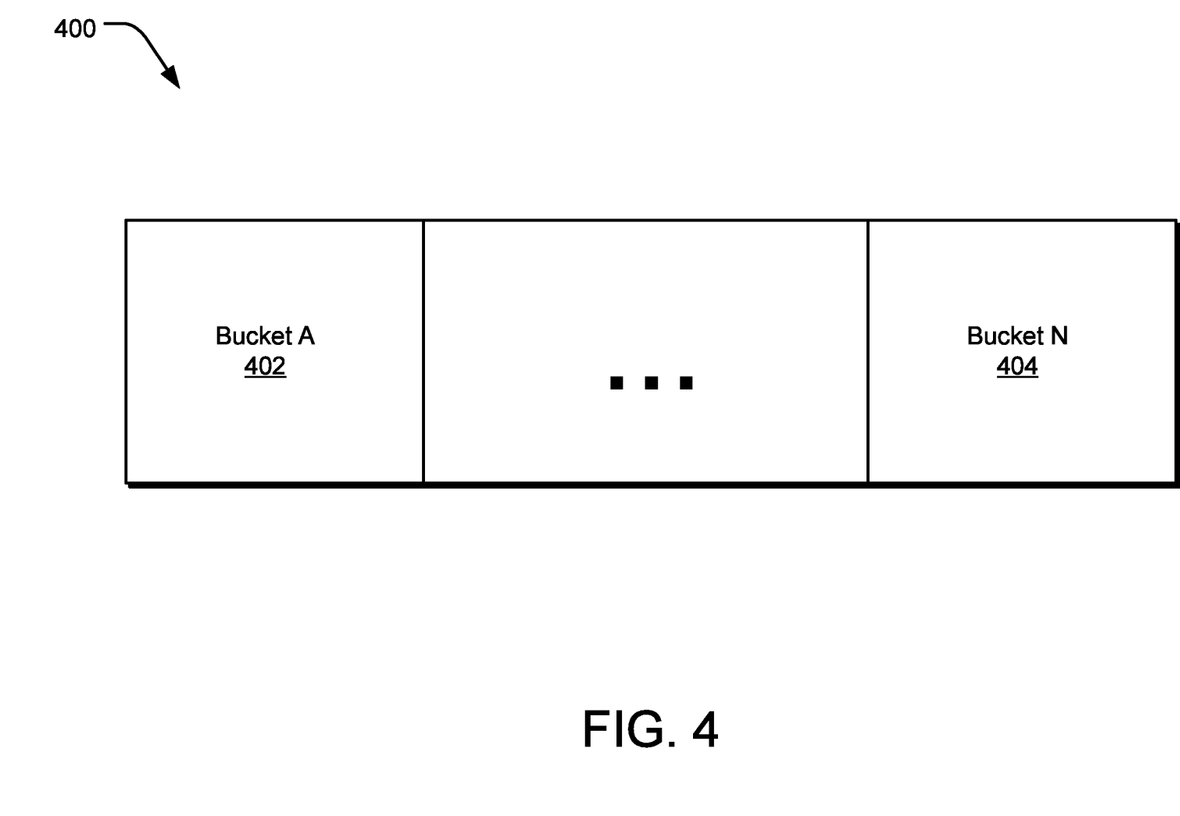
FIG. 4 shows coarse grained sorting of blocks during resilvering operations into one or more buckets.

To reduce random I/O's to the drive 120, the file system 106 sorts and sequentially resilvers the data in the file 300. Due to limited memory, in one implementation, the file system 106 does not sort all data at once. Instead, as can be understood from FIG. 4, the file system 106 first performs a coarse grained sorting of the blocks 302-308. Stated differently, the file system 106 traverses the failed disk 120 and sorts the blocks 302-308 into an array 400 of temporary objects (e.g., buckets 402-404) based on the DVA 312 of the blocks 302-308. Each of the buckets 402-404 is a temporary object that is appended to during the traverse. This temporary object can be stored persistently on disk and therefore does not need to be held in memory. In one implementation, the number of buckets 402 . . . 404 in the array 400 is based on a percentage of the amount of disk memory. For example, a 300 GB disk may be divided into five 60 GB buckets. The file system 106 sorts the blocks 302-308 into one of the buckets 402-404 based on the physical location of the block on the disk using the DVA 312. In an example implementation, for the file 300, any block with a DVA offset 312 of 0x0-0xefffffff is sorted into a first bucket; any block with a DVA offset of 0xf00000000-0x1e00000000 is sorted into a second bucket; and so on.

Figure 5:
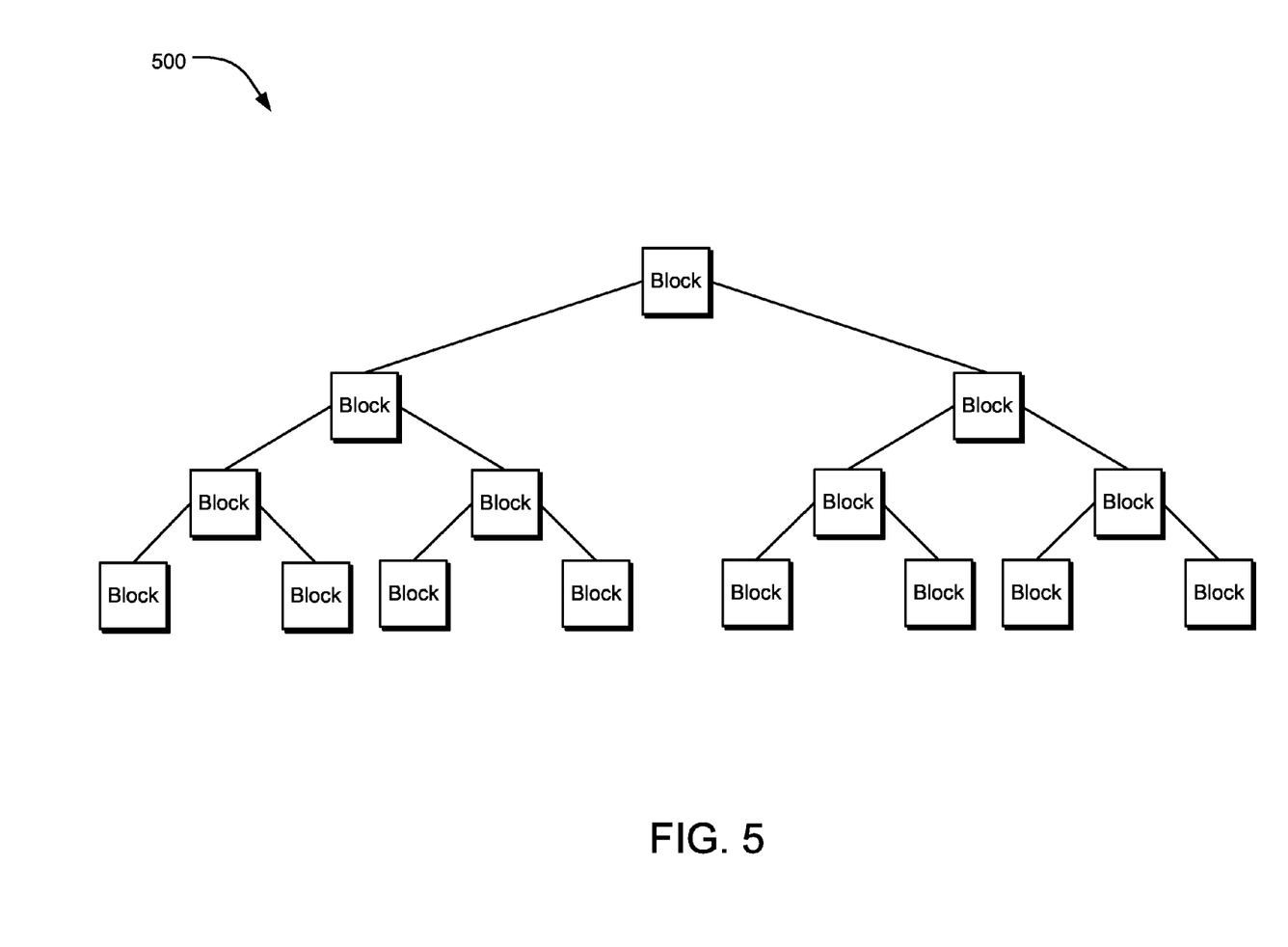
FIG. 5 shows fine grained sorting of blocks during resilvering operations into a sorted tree.

Turning to FIG. 5, the file system 106 performs a fine grained sorting of the blocks. In one implementation, the file system 106 sorts the blocks in the first bucket 402 into a sorted tree 500 by block location disk offset. For example, for the file 300, during fine grained sorting, the first bucket 402 having blocks with the DVA offset 312 of 0x0-0xefffffff is sorted into the sorted tree 500. In one implementation, the sorted tree 500 is an AVL tree. The file system 106 sequentially resilvers the blocks in the first bucket 402 based on the sorted tree 500. Once all the blocks in the bucket 402 are resilvered, the file system 106 deletes the bucket 402 and sorts the blocks in the next bucket in the array 400. For example, for the file 300, the second bucket having a DVA offset 312 of 0xf00000000-0x1e00000000 are fine grained sorted and sequentially resilvered. The file system 106 repeats this until all the buckets 402-404 in the array 400 are deleted.

In one implementation, because the file system 106 may still issue writes to the storage pool 118 during resilvering operations, a block may no longer exist by the time it is to be resilvered, as shown in FIG. 3. Such freed blocks do not need resilvering, and thus in one implementation, are appended to the bucket 402 or removed during fine grained sorting.

Figure 6:
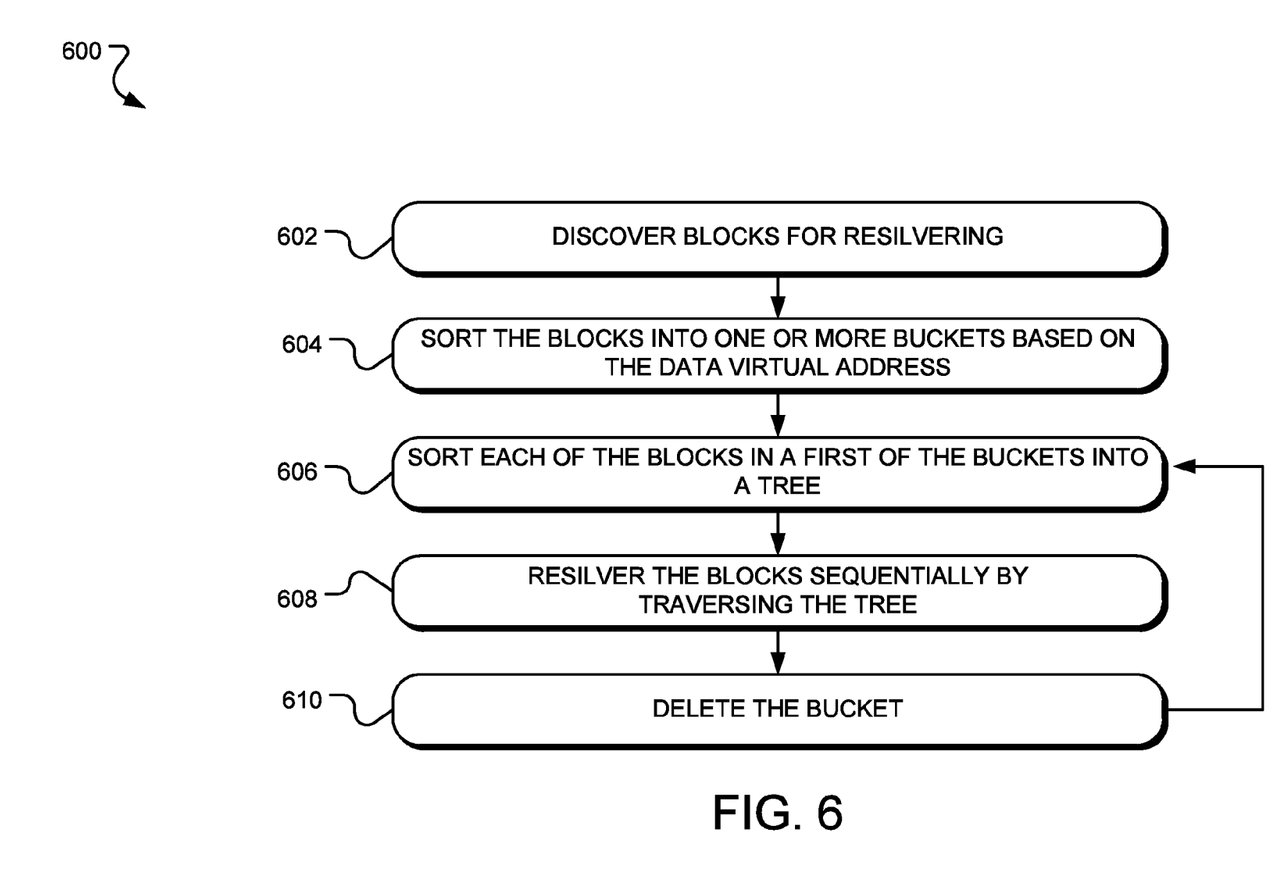
FIG. 6 illustrates example operations for sequential resilvering.

FIG. 6 illustrates example operations 600 for sequential resilvering. In one implementation, an operation 602 discovers blocks for resilvering. The operation 602 discovers the blocks by identifying a failed drive and traversing the data at a logical level. The operation 602 tracks each block in the failed disk and its corresponding DVA offset indicating a physical location of the block on the disk.

An operation 604 sorts the blocks into one or more buckets based on the DVA, and an operation 606 sorts each of the blocks in a first of the buckets into a sorted tree. An operation 608 resilvers the blocks in the first bucket sequentially by traversing the sorted tree. An operation 610 deletes the first bucket and the operations 606-610 are repeated until all the buckets are deleted.

Figure 7:
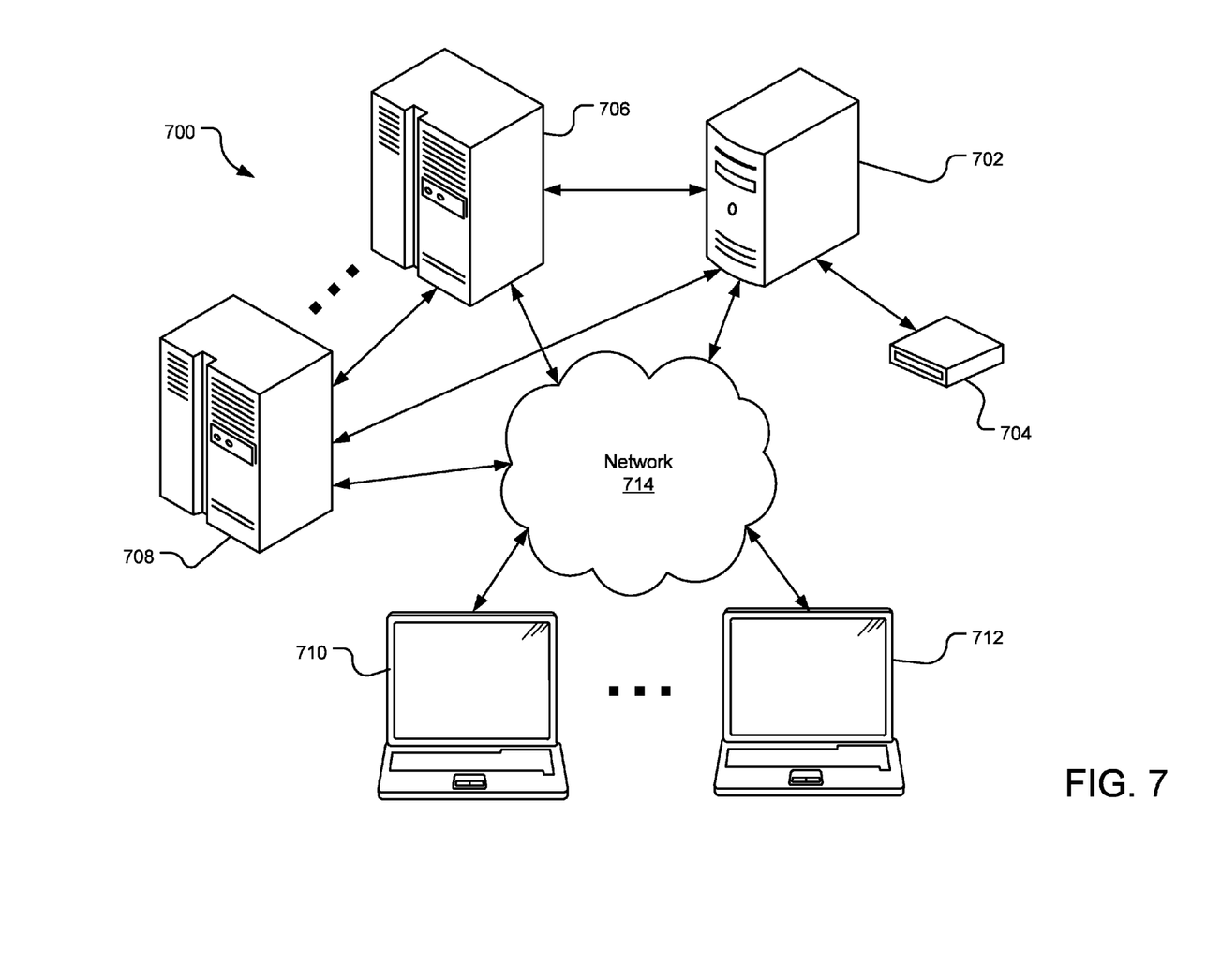
FIG. 7 is an example network environment that may implement various systems and methods of the presently disclosed technology.

As can be understood from FIG. 7, a storage server 702 may be connected to one or more storage appliances 706, 708. Persistent memory 704 may be attached to the storage server 702. The persistent memory 704 may include any persistent type of memory, such as a conventional spinning disk hard drive or a solid state hard drive.

The storage server 702 may be configured to direct data to and from the storage appliances 706, 708 according to the systems and methods described herein. In one implementation, the storage server 702 may be configured to operate according to the NFS protocol. One or more clients 710, 712 may have a need for data that is stored on one of the storage appliances 706, 708. The clients 710, 712 may connect to the storage server 702 using the network 714 and request the data. The storage server 702 may then facilitate the transfer of the data from the storage appliances 706, 708 to the requesting client(s) 710, 712. This may include acting as an intermediary by retrieving the data from the storage appliances 706, 708, temporarily holding it on the storage server 702, and then forwarding the data over the network 714 to the client(s) 710, 712. In other cases, the storage server 702 may provide the client with information on how to obtain the data directly from the storage appliance 706, 708. For example, the storage server 702 may provide the client(s) 710, 712 with metadata corresponding to the requested data stored on the storage appliance 706, 708. The metadata may include information regarding the location of the data in the storage appliance 706, 708. For example, in the case where the storage appliance 706, 708 is a ZFS storage appliance, the metadata may include location information, such as in which zpool or virtual device the data is stored and any other information regarding the location of the data.

In one implementation, the storage server 702 includes the file system 106 configured to facilitate copy-on-write transactions to and from the storage appliances 706, 708. Where there is a failure of a storage device (e.g., one or more disks in the storage appliances 706 and 708), the storage server 702 creates an array of on-disk objects. For each block that is on the failed device, a disk offset describing the block location is appended to one of the objects, and the object written is based on the DVA offset. The storage server 702 reads the blocks in the object into a sorted tree (e.g., an AVL tree) by block location disk offset. The storage server 702 sequentially resilvers the blocks based on the sorted tree. The storage server 702 deletes the object and sorts the blocks in the next object in the array. The storage server 702 repeats this until all the objects in the array are deleted.

Figure 8:
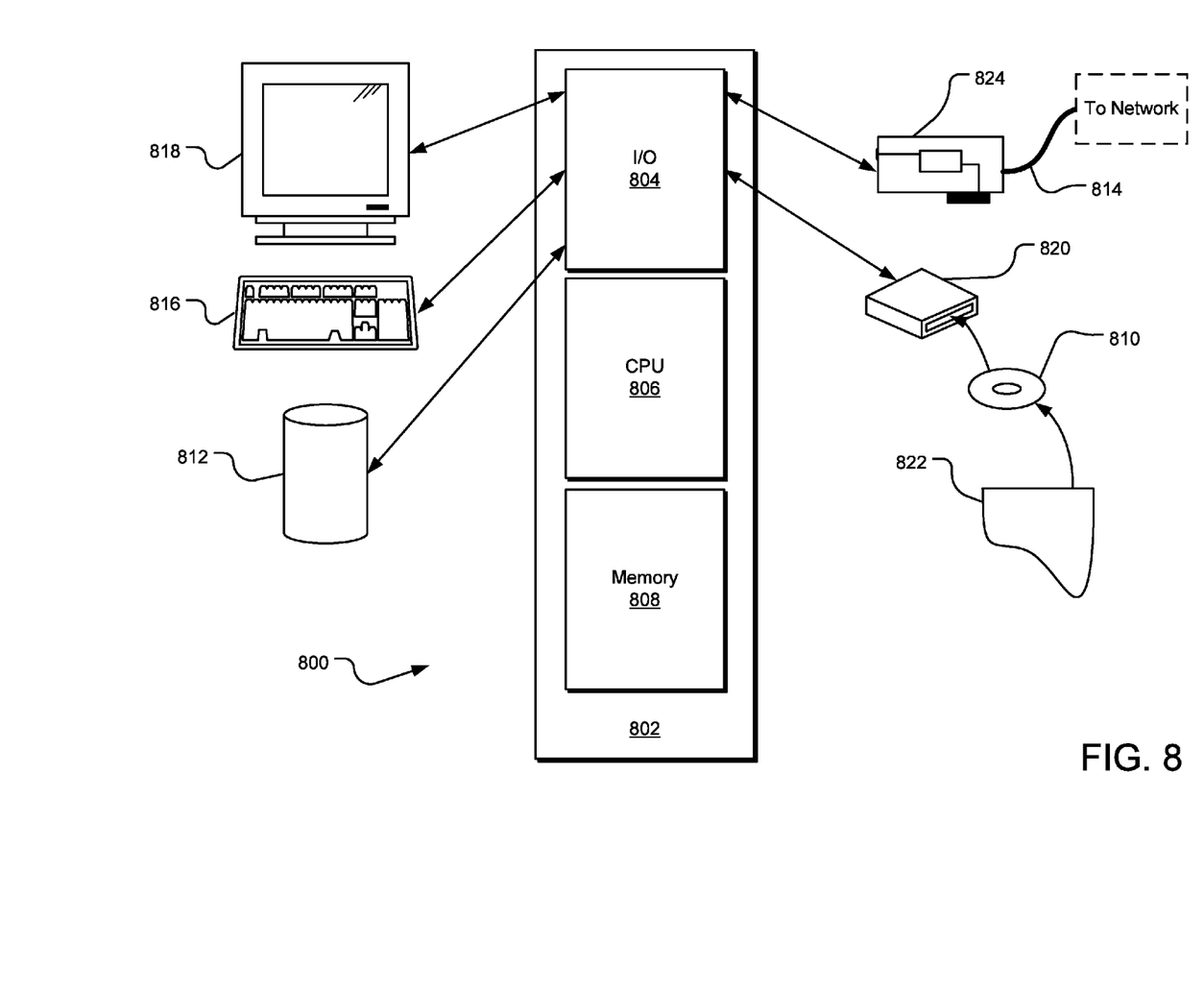
FIG. 8 is an example computing system that may implement various systems and methods of the presently disclosed technology.

Referring to FIG. 8, a general purpose computer system 800 includes one or more computing devices capable of executing a computer program product to execute a computer process. Data and program files may be input to the computer system 800, which reads the files and executes the programs therein. Some of the elements of the general purpose computer system 800 are shown in FIG. 8, wherein a processor 802 is shown having an input/output (I/O) section 804, a Central Processing Unit (CPU) 806, and memory 808.

There may be one or more processors 802, such that the processor 802 of the computer system 800 comprises the CPU 806 or a plurality of processing units, commonly referred to as a parallel processing environment. The computer system 800 may be a conventional computer, a distributed computer, or any other type of computer, such as one or more external computers made available via a network architecture, for example as described with respect to FIG. 8. The presently described technology is optionally implemented in software devices loaded in the memory 808, stored on a configured DVD/CD-ROM 810 or a storage unit 812, and/or communicated via a wired or wireless network link 814 on a carrier signal, thereby transforming the computer system 800 in FIG. 8 to a special purpose machine for implementing the operations described herein.

The I/O section 804 is connected to one or more user-interface devices (e.g., a keyboard 816 and a display unit 818), the storage unit 812, and a disk drive 820. In one implementation, the disk drive 820 is a DVD/CD-ROM drive unit capable of reading the DVD/CD-ROM 810, which typically contains programs and data 822. In another implementation, the disk drive 820 is a solid state drive unit.

Computer program products containing mechanisms to effectuate the systems and methods in accordance with the presently described technology may reside in the memory 804, on the storage unit 812, on the DVD/CD-ROM 810 of the computer system 800, or on external storage devices made available via a network architecture with such computer program products, including one or more database management products, web server products, application server products, and/or other additional software components. Alternatively, the disk drive 820 may be replaced or supplemented by a floppy drive unit, a tape drive unit, or other storage medium drive unit. The network adapter 824 is capable of connecting the computer system 800 to a network via the network link 814, through which the computer system 800 can receive instructions and data embodied in a carrier wave. An example of such systems is personal computers. It should be understood that computing systems may also embody devices such as Personal Digital Assistants (PDAs), mobile phones, tablets or slates, multimedia consoles, gaming consoles, set top boxes, etc.

When used in a LAN-networking environment, the computer system 800 is connected (by wired connection or wirelessly) to a local network through the network interface or adapter 824, which is one type of communications device. When used in a WAN-networking environment, the computer system 800 typically includes a modem, a network adapter, or any other type of communications device for establishing communications over the wide area network. In a networked environment, program modules depicted relative to the computer system 800 or portions thereof, may be stored in a remote memory storage device. It is appreciated that the network connections shown are examples of communications devices for and other means of establishing a communications link between the computers may be used.

In an example implementation, data resilvering software and other modules and services may be embodied by instructions stored on such storage systems and executed by the processor 802. Some or all of the operations described herein may be performed by the processor 802. Further, local computing systems, remote data sources and/or services, and other associated logic represent firmware, hardware, and/or software configured to control data access. Such services may be implemented using a general purpose computer and specialized software (such as a server executing service software), a special purpose computing system and specialized software (such as a mobile device or network appliance executing service software), or other computing configurations. In addition, one or more functionalities of the systems and methods disclosed herein may be generated by the processor 802 and a user may interact with a Graphical User Interface (GUI) using one or more user-interface devices (e.g., the keyboard 816, the display unit 818, and the user devices 804) with some of the data in use directly coming from online sources and data stores.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium (e.g., floppy diskette), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

While the present disclosure has been described with reference to various implementations, it will be understood that these implementations are illustrative and that the scope of the disclosure is not limited to them. Many variations, modifications, additions, and improvements are possible. More generally, implementations in accordance with the present disclosure have been described in the context of particular implementations. Functionality may be separated or combined in blocks differently in various implementations of the disclosure or described with different terminology. These and other variations, modifications, additions, and improvements may fall within the scope of the disclosure as defined in the claims that follow.

What is claimed is:

1. A method for reconstructing data comprising:
   discovering a plurality of blocks for resilvering using at least one computing device, the blocks corresponding to input/output requests not successfully completed for a failed storage device;
   coarse grained sorting the plurality of blocks using the at least one computing device, the coarse grained sorting based on a block location of each of the plurality of blocks on the failed storage device;
   storing the block location of each of the plurality of blocks on disk according to the coarse grained sorting;
   fine grained sorting the coarse grained sorted plurality of blocks further based on the block location using the at least one computing device; and
   resilvering the fine grained sorted plurality of blocks sequentially according to the block location using the at least one computing device.

2. The method of claim 1, wherein the coarse grained sorting includes sorting each of the plurality of blocks into one of a plurality of temporary objects in an object array based on the block location of each of the plurality of blocks on the failed storage device.

3. The method of claim 2, wherein a number of the plurality of temporary objects in the object array depends on an amount of disk memory.

4. The method of claim 2, wherein the fine grained sorting includes reading the plurality of blocks into a sorted tree by block location for each of the plurality of temporary objects in the object array.

5. The method of claim 4, wherein the plurality of blocks are sequentially resilvered based on the sorted tree for each of the plurality of temporary objects in the object array.

6. The method of claim 1, wherein the fine grained sorting includes reading each of the plurality of blocks into a sorted tree by the block location.

7. The method of claim 6, wherein the sorted tree is an Adelson Velskii Landis tree.

8. The method of claim 1, wherein the sequential resilvering includes sequentially traversing the plurality of blocks in logical block order to reconstruct data for which the input/output requests were not successfully completed for the failed storage device.

9. One or more tangible non-transitory computer-readable storage media storing computer-executable instructions for performing a computer process on a computing system, the computer process comprising:
   discovering a plurality of blocks for resilvering;
   storing an object array having a first temporary object on disk;
   sorting a first subset of the plurality of blocks into the first temporary object based on a block location of each of the plurality of blocks;
   reading each of the plurality of blocks in the first temporary object into a sorted tree;
   resilvering each of the plurality of blocks in the first temporary object sequentially based on the sorted tree; and
   deleting the first temporary object following the sequential resilvering of the plurality of blocks in the first subset.

10. The one or more tangible non-transitory computer-readable storage media of claim 9, wherein the object array further includes a second temporary object.

11. The one or more tangible non-transitory computer-readable storage media of claim 10, further comprising:
    sorting a second subset of the plurality of blocks into the second temporary object based on the block location of each of the plurality of blocks.

12. The one or more tangible non-transitory computer-readable storage media of claim 11, further comprising:
    reading each of the plurality of blocks in the second temporary object into a second sorted tree.

13. The one or more tangible non-transitory computer-readable storage media of claim 12, further comprising:
    resilvering each of the plurality of blocks in the second temporary object sequentially based on the second sorted tree after the sequential resilvering of each of the plurality of blocks in the first temporary object is completed.

14. The one or more tangible non-transitory computer-readable storage media of claim 13, further comprising:
    deleting the second temporary object following the sequential resilvering of the plurality of blocks in the second subset.

15. The one or more tangible non-transitory computer-readable storage media of claim 9, wherein the sorted tree is an Adelson Velskii Landis tree.

16. A system for reconstructing data comprising:
- a storage pool having a plurality of storage devices configured to store data; and
- a file system in communication with the storage pool and having at least one processing unit configured to identify a failed device in the plurality of storage devices, the failed device corresponding to plurality of blocks for which input/output requests were not successfully completed, and to sequentially resilver the plurality of blocks based on a plurality of sorted trees, each of the plurality of sorted trees corresponding to one of a plurality of temporary objects in an object array.

17. The system of claim 16, wherein each of the plurality of blocks are sorted into one of the plurality of temporary objects based on a block location on the failed storage device.

18. The system of claim 16, wherein the plurality of blocks are sorted into the plurality of sorted trees by block location.

19. The system of claim 16, wherein the plurality of temporary objects in the object array are stored on disk.

20. The system of claim 16, wherein each of the plurality of sorted trees is an Adelson Velskii Landis tree.

* * * * *

UNITED STATES PATENT AND TRADEMARK OFFICE
CERTIFICATE OF CORRECTION

PATENT NO. : 9,594,635 B2
APPLICATION NO. : 14/477645
DATED : March 14, 2017
INVENTOR(S) : Taylor et al.

Page 1 of 1

It is certified that error appears in the above-identified patent and that said Letters Patent is hereby corrected as shown below:

In the Specification

In Column 4, Line 2, delete "resilevered" and insert -- resilvered --, therefor.

Signed and Sealed this
Twenty-ninth Day of August, 2017

Joseph Matal
*Performing the Functions and Duties of the*
*Under Secretary of Commerce for Intellectual Property and*
*Director of the United States Patent and Trademark Office*